(12) United States Patent
Raphaeli et al.

(10) Patent No.: US 6,690,719 B1
(45) Date of Patent: Feb. 10, 2004

(54) HOST TO MODEM INTERFACE

(75) Inventors: Dan Raphaeli, Kfar Saba (IL); Gonen Barkan, Arad (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 09/504,054

(22) Filed: Feb. 14, 2000

(51) Int. Cl.[7] .................................................. H04B 1/38
(52) U.S. Cl. ..................................... 375/222; 375/220
(58) Field of Search ................................ 375/222, 219, 375/220, 377, 356; 370/282; 713/400

(56) References Cited

U.S. PATENT DOCUMENTS

| | | |
|---|---|---|
| 3,934,203 A | 1/1976 | Schiff |
| 4,477,912 A | 10/1984 | Russell |
| 5,090,024 A | 2/1992 | Vander Mey et al. |
| 5,155,741 A | 10/1992 | Waters et al. |
| 5,179,572 A | 1/1993 | Schilling |
| 5,237,587 A | 8/1993 | Schoolcraft |
| 5,263,046 A | 11/1993 | Vander Mey |
| 5,278,862 A | 1/1994 | Vander Mey |
| 5,359,625 A | 10/1994 | Vander Mey et al. |
| 5,574,748 A | 11/1996 | Vander Mey et al. |
| 5,793,843 A | * 8/1998 | Morris ....................... 455/422 |
| 5,828,663 A | * 10/1998 | Ikegami ..................... 370/347 |
| 5,874,992 A | * 2/1999 | Caporizzo .................. 348/192 |
| 5,912,895 A | * 6/1999 | Terry et al. ................. 370/445 |
| 6,363,109 B1 | * 3/2002 | Polley et al. ............... 375/222 |

* cited by examiner

Primary Examiner—Young T. Tse
Assistant Examiner—David B. Lugo
(74) Attorney, Agent, or Firm—Howard Zaretsky

(57) ABSTRACT

An apparatus for and a method of interfacing a host to a modem. Data is transferred between the host and the modem via a serial interface. The modem provides the physical layer implementation functions (i.e., transmission and reception functions) in addition to providing low level MAC layer function processing. Functions provided include collision detection, back-off algorithm according to a programmed back-off time, conditional transmission, automatic retransmissions and ACK/NACK packet generation and processing. This serves to eliminate any stringent access timing constraints usually placed on the host processor resulting in reduced cost and complexity of the host.

24 Claims, 13 Drawing Sheets

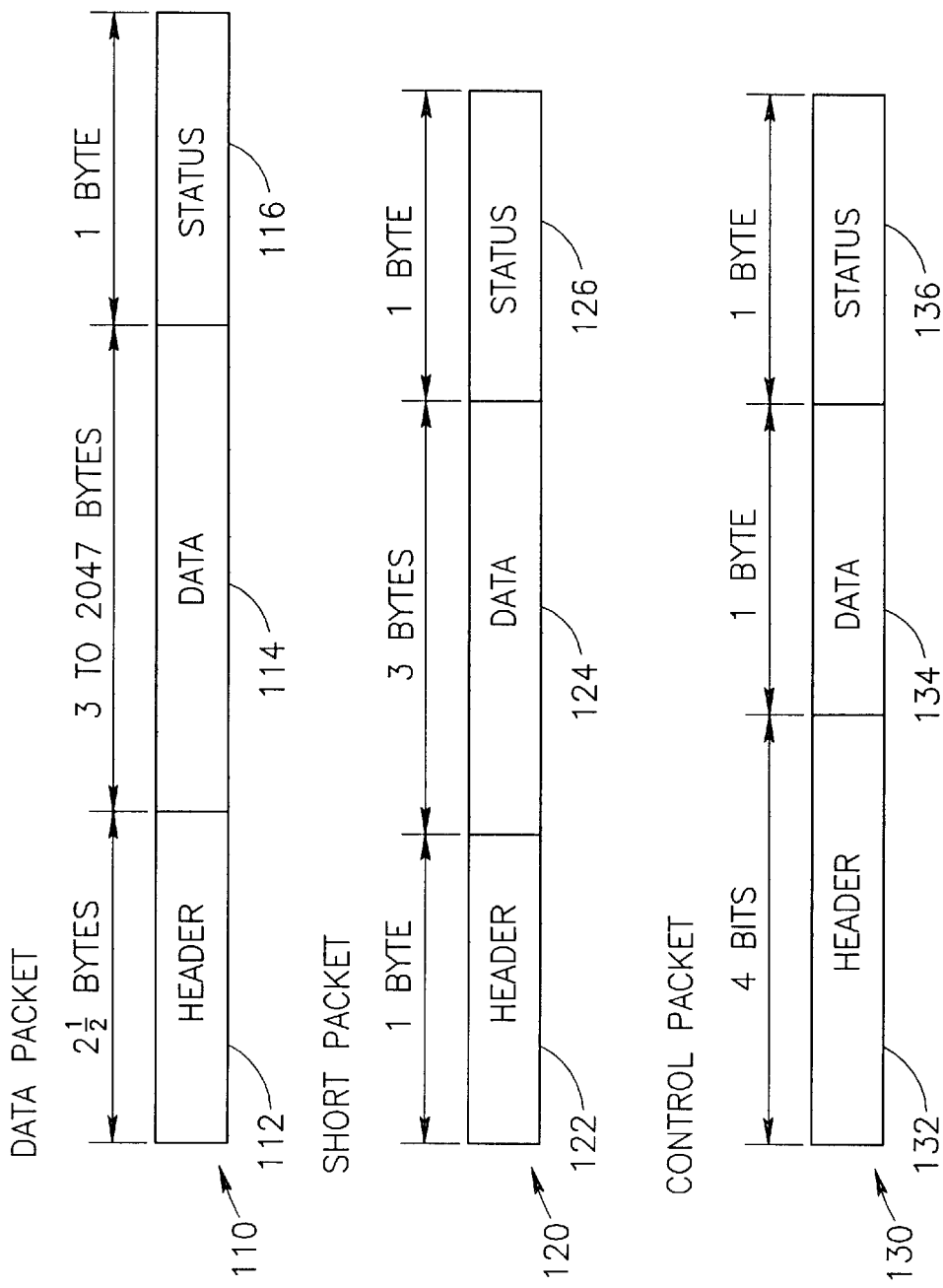

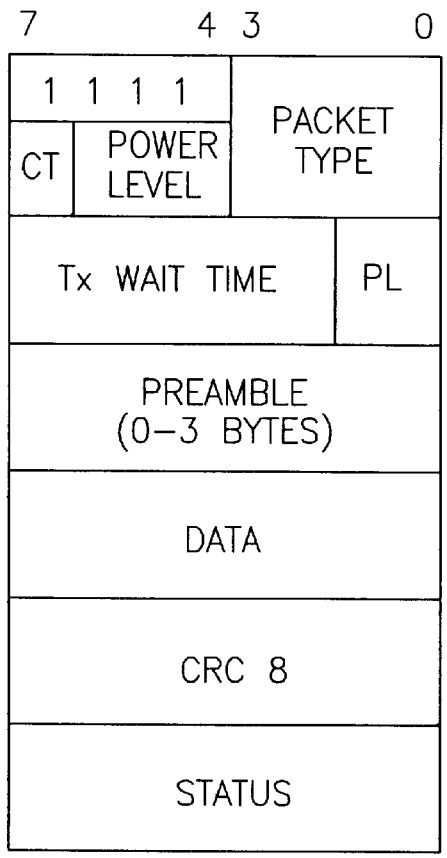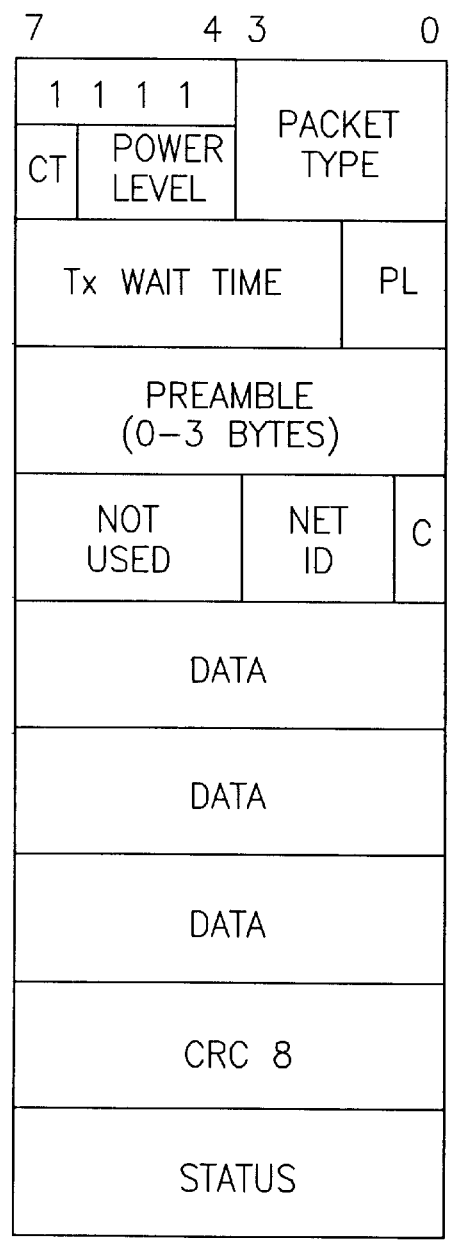
FIG.6A

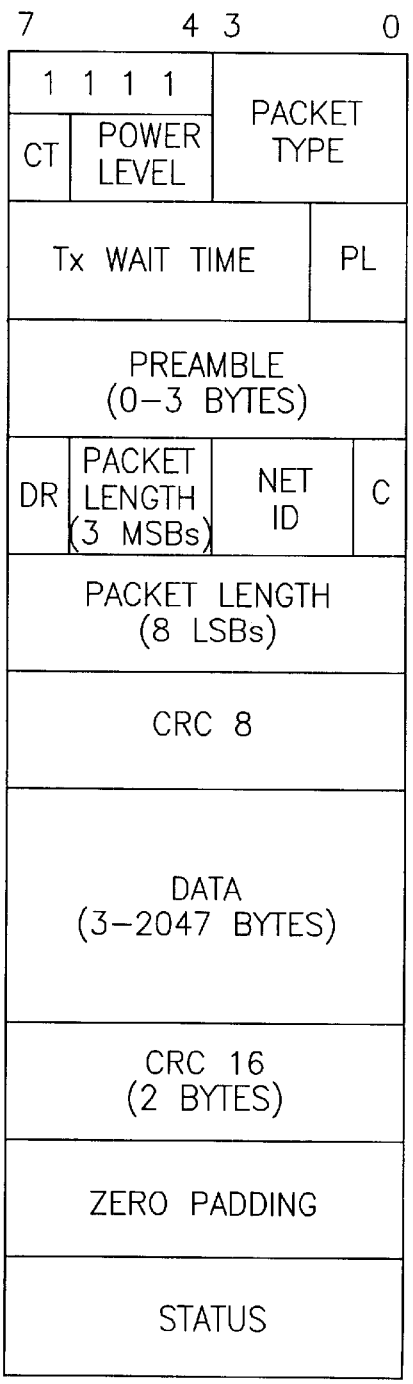
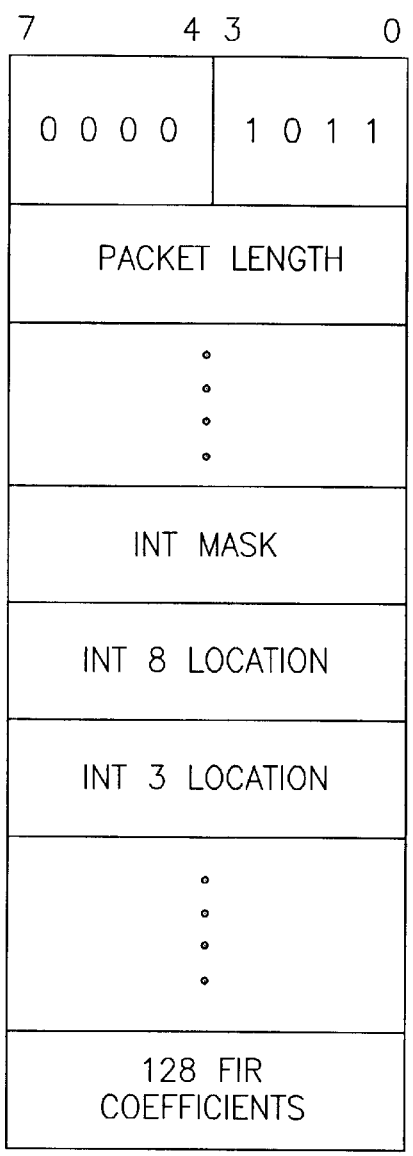
FIG.6B

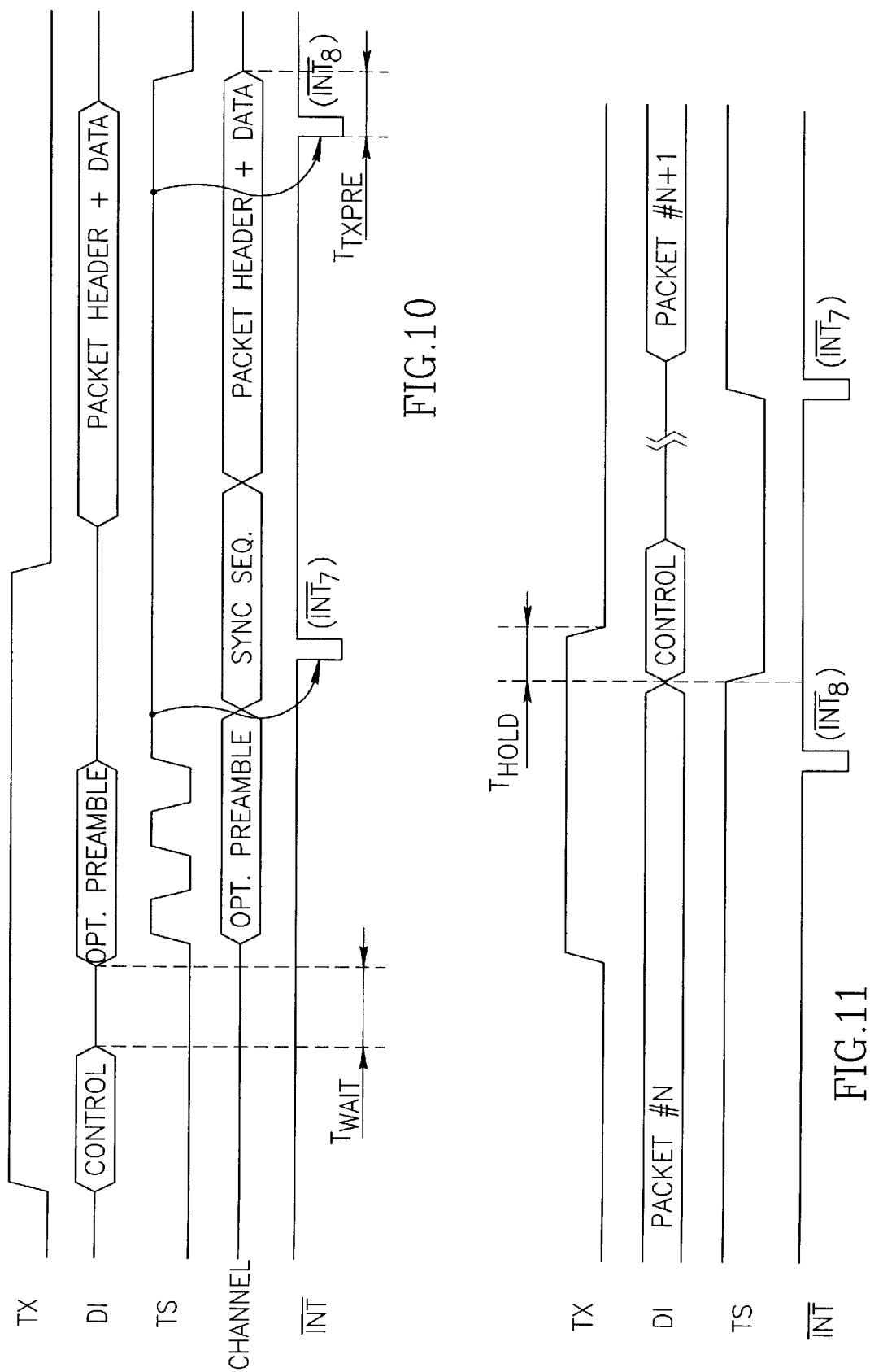

HOST TO MODEM INTERFACE

FIELD OF THE INVENTION

The present invention relates generally to data communication systems and more particularly relates to an apparatus for and a method of implementing an interface between a host and a modem.

BACKGROUND OF THE INVENTION

The use of all types of communications systems is currently increasing at a rapid rate. All types of communications systems, such as RF, power line, twisted, IR, optical fiber, cable, etc., are being used in newly developed data communication and networking products and in products that traditionally did not include any communications means such as home appliances like refrigerators, microwave ovens, etc. Many of these communication systems are manufactured as modules or components that are designed into existing or new product lines.

Communication components such as modems are being constructed as complex monolithic devices containing almost all the analog and digital circuitry required to connect a host to a communication channel. Typically, however, a heavy processing burden is placed on the host to provide the low level MAC processing for the communications link. Most prior art communications devices simply provide the physical layer circuitry and components, i.e., the transmitter and receiver functions (modulator and demodulator). The host is required to perform all the link layer functions such as collision detection and retransmissions.

With the advent of consumer demand for more functionality from products today, there is an ever increasing demand placed on product designers to include more and more functions in their products. Many of these advanced features are complex requiring a large amount of computing resources or requiring additional complex circuitry. To reduce the burden on system/product designers, therefore, it would be desirable to have a communications component that performed a portion of the upper layer functionality, e.g., MAC layer processing, in addition to the physical layer functionality. Such a device would simplify the design or such communication systems and reduce the cost and complexity associated therewith.

SUMMARY OF THE INVENTION

The present invention is an apparatus for and a method of interfacing a host to a modem. The host may comprise any suitable device that provides data to the modem for transmission over the attached communication channel, provides control information to the modem to control its operation and receives data and status from the modem from data received over the channel. The modem may comprise any suitable communications modem capable of transmitting data over and receiving data from a channel. The channel may comprise any suitable media including but not limited to RF, IR, power line carrier, twisted pair, optical fiber and coaxial cable.

For example purposes, the present invention is described in the context of a Code Shift Keying (CSK) modem whereby data is conveyed in a direct sequence spread spectrum signal. CSK communications systems (differential and non-differential) are applicable to relatively noisy environments such as the AC power line.

In a CSK transmission system, the data is transmitted in the form of time shifts between consecutive circularly rotated waveforms of length T that are referred to as spreading waveforms, i.e., spread spectrum correlator sequence waveforms. The spreading waveforms can comprise any type of waveform that has suitable auto correlation properties. During each symbol period, referred to as a unit symbol time (UST), a plurality of bits are transmitted. The symbol period is divided into a plurality of shift indexes with each shift index representing a particular bit pattern. The -information, i.e., bit pattern, is conveyed by rotating the spreading waveform by a certain amount corresponding to the data to be transmitted. The data is conveyed in the degree of rotation or circular shift applied to the spreading waveform (also referred to as a chirp) before it is transmitted.

In addition to conveying information in the shift applied to the spreading sequence, additional information can be conveyed in the sign of the symbol or more generally in its phase if there is a carrier present.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

Upon reception by the receiver, the signal is input to a matched filter having a template of the spreading waveform pattern to detect the amount of rotation (or circular shift) within the received signal for each symbol. The received data is fed into a shift register and circularly rotated, i.e., shifted. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

The transmitter transmits data in the form of packets to the receiver. Each packet is preceded by a synchronization sequence comprising a predetermined number of symbols. The length of the synchronization sequence can be any suitable number of symbols such that the receiver is able to synchronize with the transmitter. An optional preamble may also be sent which comprises a sequence comprising any number of zero rotated symbols (or symbols with a constant fixed rotation) followed by any number of non-zero rotated symbols having a known predetermined random shift. The rotation that is applied to each symbol is independent of the rotation applied to other symbols.

The modem is adapted to provide an interface to support data transfers between the host and the modem. Although the information transfer may comprise any suitable form, the example modem presented herein below is adapted to provide a serial interface using three signal lines: data clock, data in and data out. In addition to the serial link signals, the host provides a transmit request TX and a RESET line. The modem provides a channel transmission signal TS, interrupt request line INT and carrier detect CD signal.

A key feature of the present invention is that the modem not only provides the physical layer implementation functions (i.e., transmission and reception functions) but also provides low level MAC layer function processing. The means (either circuitry, software or the combination of the two) for providing the low level MAC processing serves to greatly enhance the functionality of the modem and reduce the burden of the host processor. This serves to eliminate any stringent access timing constraints usually placed on the host processor resulting in reduced cost and complexity of the host.

Functions provided include collision detection, back-off algorithm according to a programmed back-off time, conditional transmission, automatic retransmissions and ACK/NACK packet generation and processing. The modem also comprises collision detection means that utilizes a collision detection preamble. The use of the collision detection preamble is optional, and if selected is performed at the beginning of each packet to be transmitted. In addition, the low level MAC processing handles the situation whereby a packet is received during transmission of the preamble or back-off time.

There is provided in accordance with the present invention a modem controller apparatus for use in a modem having a transmitter and a receiver, the modem coupled between a communication channel and a host comprising means for transmit data and control data from the host wherein the transmit data transmitted over the channel by the transmitter and the control data used to configure and control the operation of the modem, means for receiving data transmitted over the communications channel from the receiver and for forwarding the receive data to the host, means for waiting an optional wait period before attempting transmission of a packet onto the channel, means for transmitting an optional preamble comprising at least one quiet period and the transmission of at least one predetermined symbol, back-off means for detecting the reception of a packet during one or more quiet periods of the preamble and aborting transmission if reception of a packet is detected and means for conveying information about the last packet received by the modem in the body of the packet being transmitted.

The modem controller may include a serial interface wherein the transmit data, the control data and the received data are communicated between the host and the modem serially and wherein the host transfers both transmit data and control data to the modem within the same serial bit stream. The modem controller may include a parallel interface wherein the transmit data, the control data and the received data are communicated between the host and the modem in parallel and wherein the host transfers both transmit data and control data to the modem within the same parallel bit stream.

The back-off means is adapted to wait a random time interval or a predetermined time interval set by a user before attempting retransmission. The information may comprise an indication of the reception success or failure of the last packet received by the modem as determined by comparing the Cyclic Redundancy Check (CRC) sum calculated to that received, as conveyed via a status bit in the body of the packet to be transmitted or as conveyed via an ACK/NACK bit in the body of the packet to be transmitted.

The apparatus further comprises conditional transmission means for enabling the transmission of a packet if and only if the transmission of the previous packet was successful and wherein the information comprises an indication of the reception success or failure of the last packet received by the modem on the other end of the channel. The apparatus further comprises means for maintaining synchronization between the host and the modem whereby the host is continually informed as to the current activity of the modem.

The apparatus further comprises means for declaring initial synchronization upon detection of a fewer number of valid symbols than that required to achieve full synchronization, and wherein synchronization is either reaffirmed or de-affirmed one or more additional symbol times in the future. The apparatus further comprises means for the host to select the timing of the transmission of the next packet wherein the host prepares data to be sent to the modem and issues a transmit request signal subsequent thereto.

The apparatus further comprises means for the host to select the timing of the transmission of the next packet during the reception of a packet by the modem wherein the host prepares data to be sent to the modem and issues a transmit request signal subsequent thereto.

There is further provided in accordance with the present invention a modem apparatus coupled between a communication channel and a host, the host providing data and control packets to the modem comprising a transmitter for transmitting transmit data over the channel, a receiver for receiving data transmitted over the communications channel, detection means for detecting the reception of a packet after the host sends transmit data to the modem but before the actual transmission of data over the channel and a modem controller operative to receive transmit data and control data from the host, forward the transmit data to the transmitter for transmission over the communications channel, configure and control the operation of the modem in accordance with the control data, receive data transmitted over the communications channel from the receiver, forward the received data to the host and in response to receipt of a packet by the detection means, cause the modem to switch from a transmit mode to a receive mode without any intervention of the host and for notifying the host that the current transmission attempt is to be aborted.

The apparatus further comprises means for waiting an optional wait period before attempting transmission of a packet onto the communications channel. The apparatus further comprises means for transmitting an optional preamble comprising at least one quiet period and the transmission of at least one predetermined symbol. The apparatus further comprises means for maintaining synchronization between the host and the communication device whereby the host is continually informed as to the current activity of the communication device. The apparatus further comprises means for controlling the transmission of data over the communications channel wherein the operation of the modem control apparatus is directed according to the contents of the control data received from the host.

The apparatus further comprises means for declaring initial synchronization upon detection of a fewer number of valid symbols than that required to achieve full synchronization, and wherein synchronization is either reaffirmed or de-affirmed additional symbol times in the future. The apparatus further comprises means for the host to select the timing of the transmission of the next packet wherein the host prepares data to be sent to the modem and issues a transmit request signal subsequent thereto. The apparatus further comprises means for the host to select the timing of the transmission of the next packet during the reception of a packet by the modem wherein the host prepares data to be sent to the modem and issues a transmit request signal subsequent thereto.

There is also provided in accordance with the present invention a method for controlling low level access in a modem apparatus having a transmitter and a receiver, the modem coupled between a communication channel and a host, the method comprising receiving transmit data and control data from the host wherein the transmit data is transmitted over the channel by the transmitter and the control data is used to configure and control the operation of the modem, receiving data transmitted over the communications channel from the receiver and forwarding the receive data to the host, waiting an optional wait period before attempting transmission of a packet onto the channel, transmitting an optional preamble comprising at least one quiet period and the transmission of at least one predetermined symbol, detecting the reception of a packet during one or more quiet periods of the preamble, aborting transmission of the current packet if reception of a packet is detected and conveying information about the last packet received by the modem in the body of the packet being transmitted.

BRIEF DESCRIPTION OF THE DRAWINGS

The invention is herein described, by way of example only, with reference to the accompanying drawings, wherein:

FIG. 5 is a diagram illustrating the structure of the packets received by the host from the modem;

FIGS. 6A and 6B are a diagram illustrating the structure of the packets sent and received between the host and the modem;

FIG. 10 is a timing diagram illustrating the general transmission of data from the host to the modem and onto the channel;

FIG. 11 is a timing diagram illustrating the hold requirement for the TX signal;

DETAILED DESCRIPTION OF THE INVENTION

Notation Used Throughout

The following notation is used throughout this document.

| Term | Definition |
|------|------------|
| AC   | Alternating Current |
| BER  | Bit Error Rate |
| CD   | Carrier Detect |
| CRC  | Cyclic Redundancy Check |
| CSK  | Code Shift Keying |
| CT   | Conditional Transmission |
| DCLK | Data Clock (from modem) |
| DCSK | Differential Code Shift Keying |
| DI   | Data In (to modem) |
| DO   | Data Out (from modem) |
| EOP  | End of Packet |
| FEC  | Forward Error Correction |
| FIR  | Finite Impulse Filter |
| IR   | Infrared |
| LSB  | Least Significant Bit |
| MAC  | Media Access Control |
| MSB  | Most Significant Bit |
| RF   | Radio Frequency |
| SNR  | Signal to Noise Ratio |
| SOP  | Start of Packet |
| SPI  | Serial Peripheral Interface |
| UST  | Unit Symbol Time |
| WTT  | Wait To Transmit |

General Description

The present invention is an apparatus for and a method of implementing an interface between a host and a modem. The modem may be adapted to transmit and receive signals having any desired modulation. For illustration purposes the present invention is described in the context of a modem adapted to perform direct sequence spread spectrum modulation known as Code Shift Keying (CSK) which is adaptive by nature and able to handle variations in the channel, is resistant to pulsed noise and whose short synchronization time makes it resistant to synchronization error and timing jitter. This type of spread spectrum modulation is described in more detail in U.S. Pat. No. 6,064,6905, entitled Spread Spectrum Communication System Utilizing Differential Code Shift Keying, incorporated herein by reference in its entirety. The modem is adapted to communicate with a host whereby the host supplies data to be transmitted to the modem and accepts data that is received from the modem.

Note that throughout this document, a signal name followed by a '*' (e.g., SIGNAL*) denotes an active low signal which is also indicated by placing a solid bar over the signal name.

Figure 1:
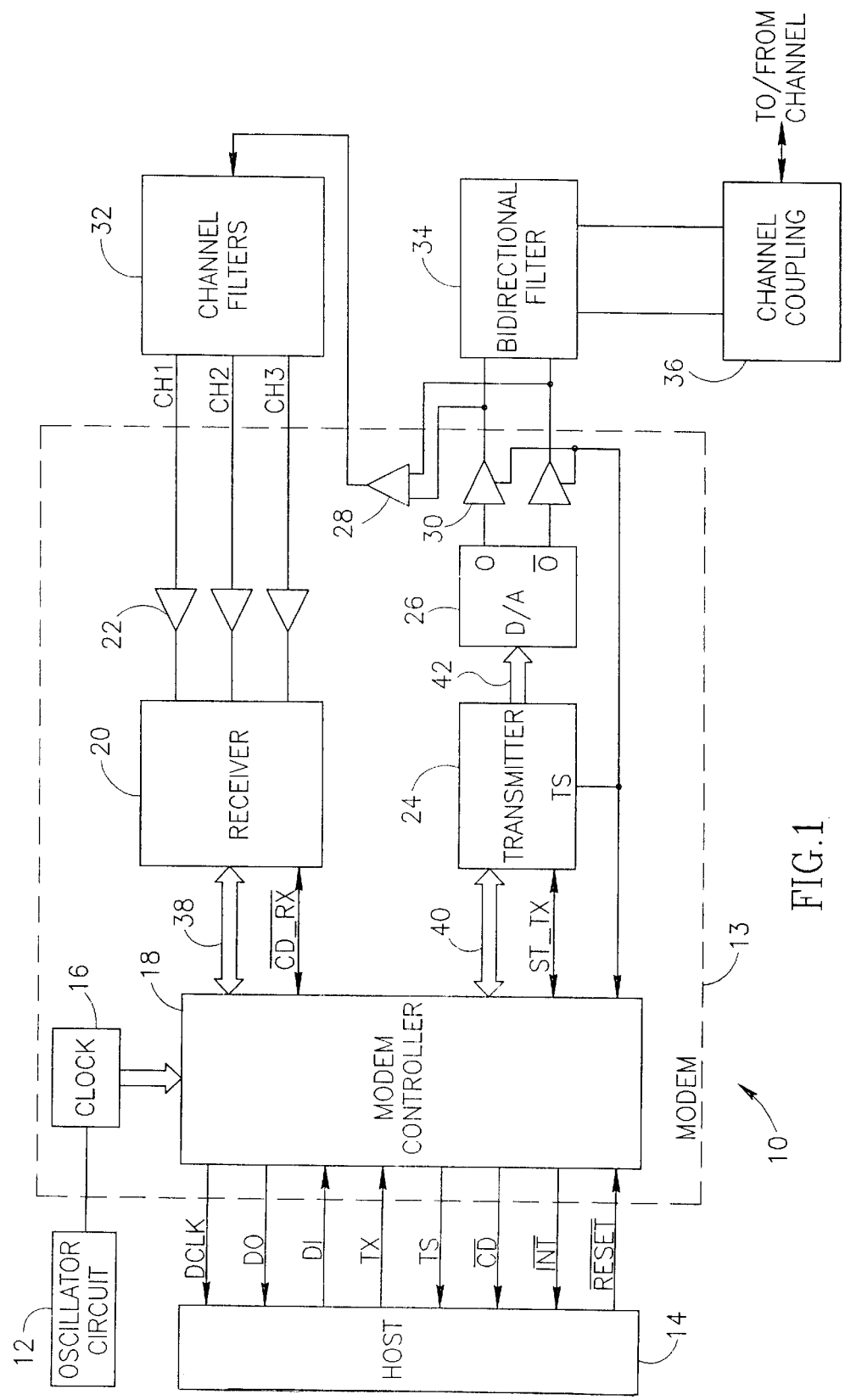
FIG. 1 is a block diagram illustrating an example modem coupled to a channel and having a Modem Controller incorporating a Serial Peripheral Interface (SPI) for interfacing to a host.

A block diagram illustrating an example modem adapted to perform CSK Modulation is shown in FIG. 1. The system, generally referenced 10, comprises a host 14, modem 13, oscillator circuit 12, channel filters 32, bidirectional filter 34 and channel coupling circuit 36. The host 14 is responsible for providing the data formation to be transmitted in addition to the control information for configuring and controlling the modem. The host communicates with the modem via a plurality of signal lines comprising clock, data and control signals. The host comprises processing means suitably programmed to transmit data and control packets to the modem and to receive and process data and status information received from the modem.

The modem 1 is coupled between a channel via channel coupling circuitry 36 and a host via a modem controller 18.

The modem 13 provides bidirectional half duplex communications suitable for use with a variety of media such as power line carrier and twisted pair cable. The modem comprises a modem controller 18, transmitter portion 24, receiver portion 20, digital to analog (D/A) converter 26, tristatic amplifiers 30, amplifiers 22 and preamplifier 28.

The host provides the data, control and configuration information via a Serial Peripheral Interface (SPI) within the modem controller. The modem controller processes the information received from the host and outputs data packets to the transmitter for transmission over the channel. The transmitter portion 24 is adapted to transmit packets of data output by the modem controller 18. The data is transferred via signal lines 40 and is clocked in via transmit strobe ST_TX. The output of the transmitter is input to the D/A converter 26 via signal bus 42. The D/A converter converts the digital output of the transmitter to an analog signal represented by a Q and inverted Q output. These two outputs are buffered by gated power amplifiers 30 before being output to the filter 34. The output amplifiers 30 are gated by the tristate control signal TS generated by the transmitter 24 and available to the host via the modem controller.

The filter 34 is optionally constructed as a bidirectional filter, able to perform a filtering function in both signal directions. The band pass filter 34 is used to filter unwanted signal components, since the spectrum of the transmit signal contains spurious signals and harmonics. The output of the filter is input to a channel coupling circuit 36 for coupling the signal to the channel. The filter comprises passive components which function to condition the signal for placement over the particular channel, e.g., power line carrier, twisted pair cable, etc.

In the receive direction, the band pass filter 34 is used to filter out of band noise and interference from the signal output from the channel coupling circuit 36. The use of the same filter for both transmit and receive reduces the number of components, cost and complexity of the system. The output of the band pass filter is amplified by preamplifier 28 before being input to a plurality of channel filters 32. In this example, three banks of filters are used to cover the desired frequency band and to generate three receive signals labeled CH1, CH2, CH3. The outputs of the channel filters are input to buffers 22 before being input to the receiver 20.

The receiver 20 is adapted to receive packets input from the channel. Packet reception functions performed by the receiver include start of packet (SOP) synchronization, header parsing and demodulation of the data. The header is configured to comprise the data rate, packet type and packet length. The modem controller checks the validity of the header using $CRC_8$ and the validity of the data payload using $CRC_{16}$. Each packet is prefixed by the host with two or more bytes that configure the transmission of packets. Examples of parameters that can be configured include packet type, data rate, power level, wait time and the collision detection preamble. For received packets, the receiver functions to detect the data rate and to inform the host of the data rate detected. The output of the receiver 20 is input to the modem controller via signal bus 38 and strobe CD_RX.

The interface between the modem controller (via the SPI) and the host comprises a plurality of data, control and clock signals. The signal names and descriptions are summarized in Table 1 below.

TABLE 1

Interface Between SPI and Host Computer

| Signal | Description |
| --- | --- |
| DCLK | SPI data clock output to the host |
| DO | SPI data output to the host |
| DI | SPI data input from the host |
| TX | Host request to send wherein a rising edge indicates a packet transmission request |
| TS | Output amplifier tristate control indicating that the modem is transmitting on the channel |
| CD* | Carrier Detect/Collision Detect (active low when SOP synchronization sequence or preamble (if transmitted) detected) |
| INT* | Interrupt output to the host |
| RESET* | Reset signal to reset the modem (active low) |

The behavior and operation of the signals used in communicating between the host and the modem controller are described in more detail herein below. Note that the serial interface described above is presented as an illustrative example. It is not intended that the present invention be limited to use of the serial interface presented above. One skilled in the electrical arts can implement communications between the host and the modem using any suitable mechanism, e.g., serial, parallel, memory mapped, etc.

Packet Types, Structure and Formatting

The system of the present invention provides four different types of packets: data, short, control and configuration. Different packets are provided in order to improve efficiency and save the overhead associated with the transmission of a small number of bytes. The short and control packet types comprise a fixed number of bytes and therefore do not require a length field. In addition, the $CRC_{16}$ normally carried on longer data packets is also not needed. Combined, a total of 28 bits are saved on short and control packets. Regular data packets have an arbitrary length between 3 and 2047 bytes; short packets comprise three bytes of payload; control packets comprise one byte of payload; and configuration packets have a fixed length.

As described previously, the host communicates with the modem via the SPI in the modem controller. Not all bytes transferred to the modem controller, however, are transmitted over the channel and not all the information transmitted over the channel is received from the host. For example, the CRC check result is generated by the modern controller and transmitted over the channel. Upon reception, the CRC check result is examined but not passed to the host. In addition, not all the bytes forwarded to the host are those received from the channel. In the receive direction, status information is not received from the channel but is generated by the modem and read by the host. Among the data transmitted by the host to the modem controller but not transmitted over the channel am the power level, back-off time and preamble bits. The structure of packets at various points in the system will now be presented. In particular, the structure of packets transmitted on the channel, sent by the host and received by the host is presented. In each case, three different types of packets are illustrated: data packets, short packets and control packets.

Figure 2:
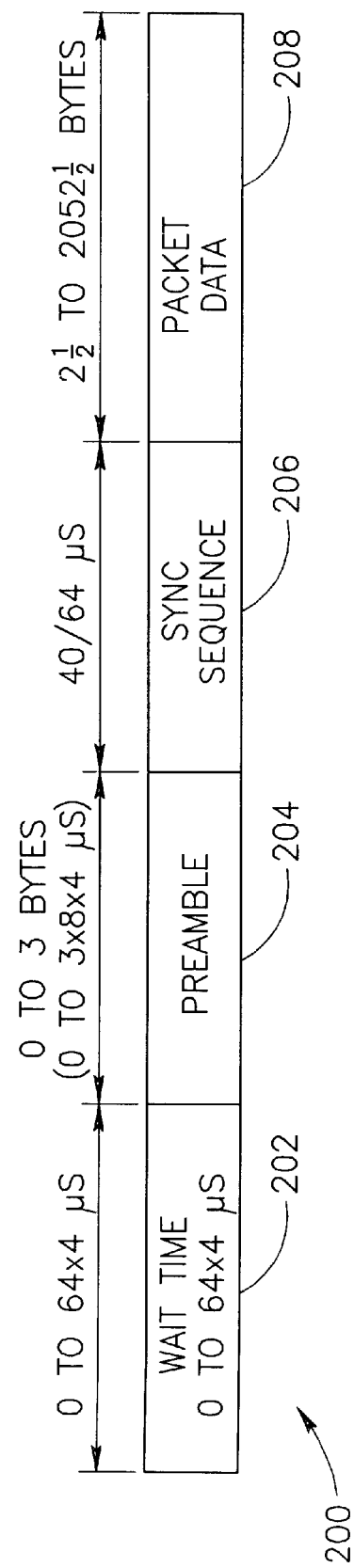
FIG. 2 is a diagram illustrating the general structure of a packet transmitted on the channel.

A diagram illustrating the structure of the packets generated by the modem and transmitted on the channel is shown in FIG. 2. The packets, generally referenced 200, that are transmitted over the channel generally have four parts: a wait time 202, an optional preamble 204 that may range up to three bytes, a synchronization (sync) sequence 206 and a variable length data portion 208. The data portion is further divided into a header, data payload and CRC check sum field.

The preamble is chosen by the host and used for collision detection whereby the receiver is listening during quiet periods of the preamble whereby no symbols are transmitted (which correspond to the 0's in the preamble byte received from the host). At other times the modem transmits predetermined symbols (e.g., zero symbols having no rotation) onto the channel, which correspond to 1's in the preamble received from the host. Assuming nodes transmit preambles at random times, if two nodes collide, i.e., transmit at the same time, a high probability exists that a symbol will be detected during a quiet period resulting in transmission being aborted.

The wait time 202 is used to implement a back-off mechanism whereby a collision with another transmitter triggers a wait time that is imposed before retransmission is attempted again. The back-off wait time can be randomized so as to reduce the likelihood of a repeat collision and is measured as the time from the end of the transmission or reception of the current packet.

The wait time mechanism can he used to implement a retransmission mechanism whereby data to be transmitted is automatically retransmitted after a time out period. The data to be transmitted is sent a first time by the host to the modem without a wait time specified. The packet is sent by the host a second time to the modem but with a wait time specified equal to the desired timeout period for receiving an acknowledge (ACK) from the modem on the other side of the channel. If an ACK is received from the modem on the other end within the wait time, the transmission is cancelled. When ACK is not received within the timeout period then the modem will transmit the packet again without any intervention by the host. In this manner, a timer mechanism is not needed in the host since the modem comprises timer means for timing the waiting period specified by the host.

Figure 3:
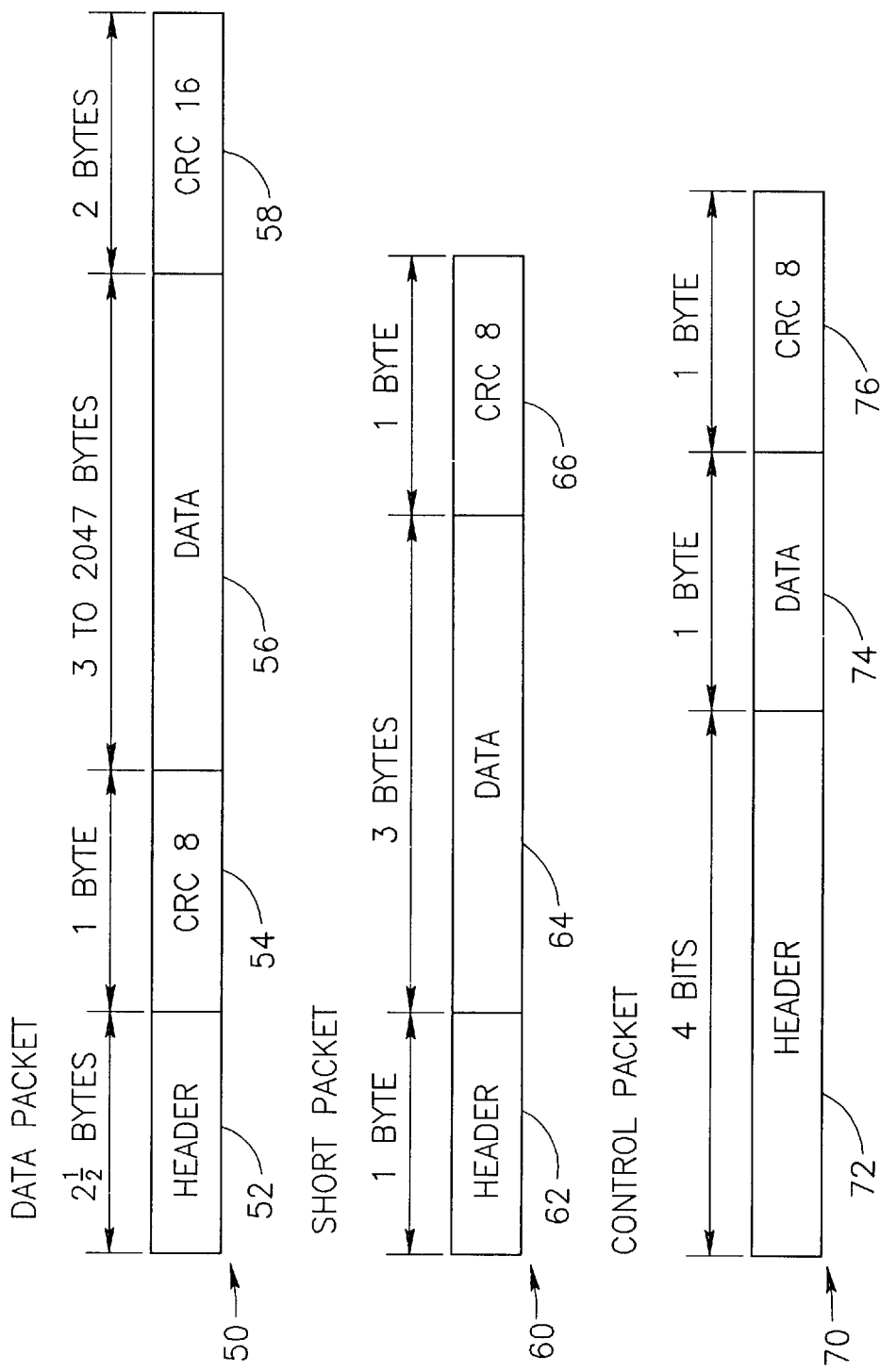
FIG. 3 is a diagram illustrating the structure of the data portion of packets generated by the modem and transmitted on the channel.

The data portion of the packet transmitted over the channel is illustrated in FIG. 3. The data packet, generally referenced 50, comprises a 20 bit header 52, 8 bit CRC check sum 54 of the header, 3 to 2047 data bits 56 and a 16 bit CRC check sum 58 of the data. The short packet, generally referenced 60, comprises an 8 bit header 62, three byte fixed data field 64 and an 8 bit CRC check sum 66 of the data. The control packet, generally referenced 70, comprises a four bit header 72, one byte fixed data field 74 and an 8 bit CRC check sum 76 of the data.

Figure 4:
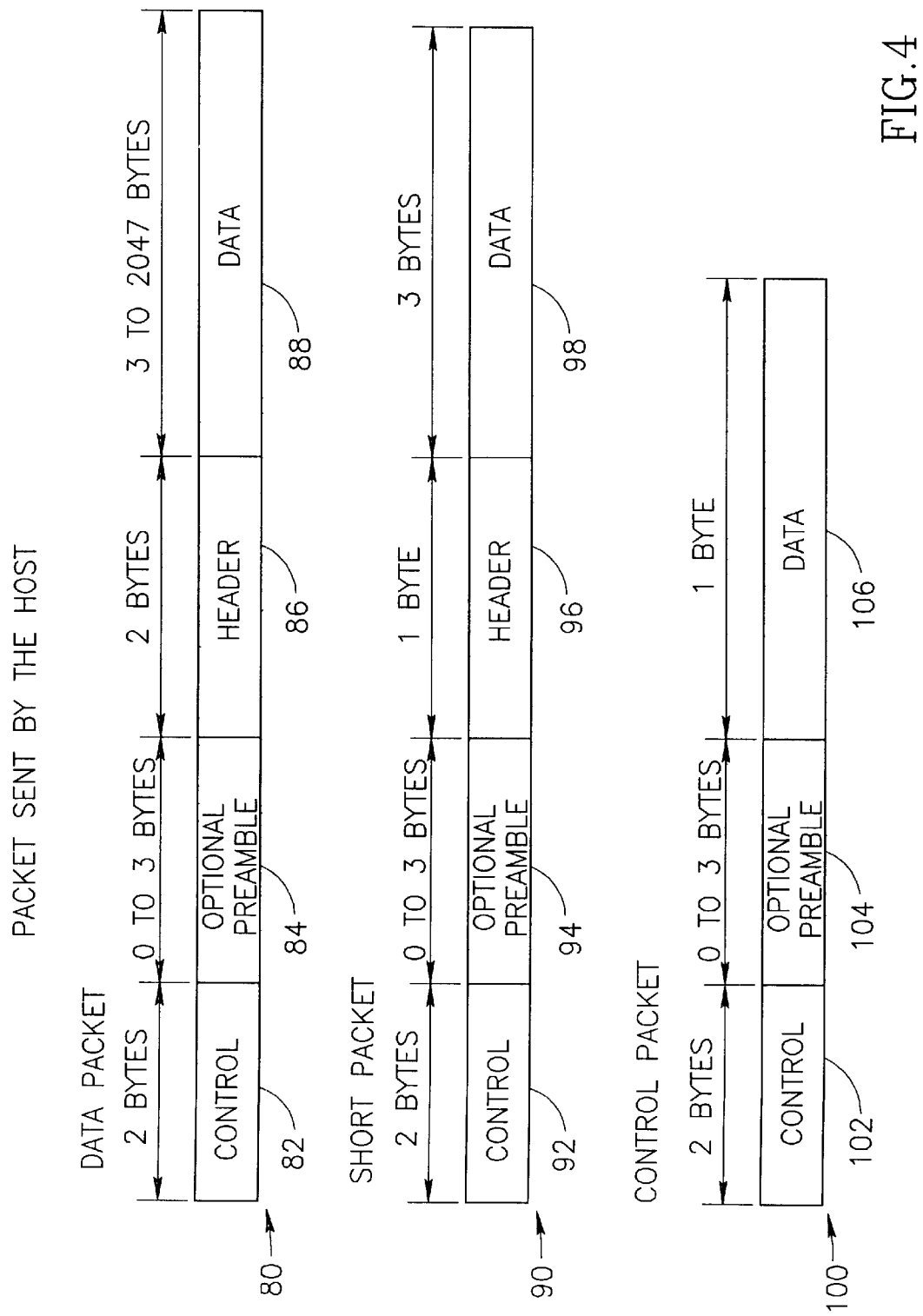
FIG. 4 is a diagram illustrating the structure of the packets sent by the host to the modem.

A diagram illustrating the structure of the packets sent by the host to the modem is shown in FIG. 4. The data packet, generally referenced 80, comprises a two byte control field 82, maximum three byte optional preamble 84, two byte header 86 and a 3 to 2047 byte data field 88. The short packet, generally referenced 90, comprises a two byte control field 92, maximum three byte optional preamble 94, one byte header and fixed three byte data field 98. The control packet, generally referenced 100, comprises a two byte control field 102, maximum three byte optional preamble 104 and a fixed one byte data field 106. The contents of the control field are described in more detail herein below.

A diagram illustrating the structure of the packets received by the host from the modem is shown in FIG. 5. The data packet, generally referenced 110, comprises a 20 bit header field 112, 3 to 2047 byte data field 114 and an 8 bit status field 116. The short packet, generally referenced 120, comprises an 8 bit header 122, fixed three byte data field 124 and a an 8 bit status field 126. The control packet, generally referenced 130, comprises a 4 bit header field 132, fixed 8 bit data field 134 and an 8 bit status field 136.

A diagram illustrating the structure of the packets sent and received between the host and the modem is shown in FIGS. 6A and 6B. The contents of the control packet, generally referenced 140, vary depending on whether it is being transmitted or received. For transmission, the control packet sent by the host to the modem comprises: a conditional transmission (CT) bit which if a '1' indicates to the transmitter to transmit only if the CRC of the last packet received was correct and if a '0' indicates to transmit regardless of the CRC of the last packet received; a three bit power level field indicates one of 8 output power levels; a four bit packet type field indicates the symbol rate and the number of bits per symbol; a six bit Tx wait time field indicates the length of time the transmitter is to wait before transmitting the packet onto the channel; a two bit preamble length field indicates the number of bytes in the preamble which can range from 0 (i.e., no preamble) to 3; a 0 to 3 byte optional preamble and a single control byte.

The 4 bit packet type, 8 data bits and 8 bit CRC value are placed onto the channel for a total of 20 bits. For receiving, the control packet sent by the modem to the host comprises: a '1111' sequence appended to the 4 bit packet type, 8 bits of data and an 8 bit status field.

The contents of the short packet, generally referenced 142, vary depending on whether it is being transmitted or received. For transmission, the short packet comprises: a conditional transmission (CT) bit which if a '1' indicates to the transmitter to transmit only if the CRC or the last packet received was correct and if a '0' indicates to transmit regardless of the CRC of the last packet received; a three bit power level field indicates one of eight output power levels: a 4 bit packet type field indicates the symbol rate and the number of bits per symbol; a 6 bit Tx wait time field indicates the length of time the transmitter is to wait before transmitting the packet into the channel; a 2 bit preamble length field indicates the number of bytes in the preamble which can range from 0 (i.e., no preamble) to 3; the 0 to 3 byte optional preamble and three data bytes.

The 4 bit packet type, a 3 bit network ID field, a status bit, three data bytes and 8 bit CRC value are placed onto the channel for a total of 40 bits. For receiving, the short packet sent by the modem to the host comprises: a '1111' sequence appended to the 4 bit packet type, three data bytes and an 8 bit status field.

The contents of the data packet, generally referenced 144, vary depending on whether it is being transmitted or received. For transmission, the data packet comprises: a conditional transmission (CT) bit which if a '1' indicates to the transmitter to transmit only if the CRC of the last packet received was correct and if a '0' indicates to transmit regardless of the CRC of the last packet received; a three bit power level field indicates one of 8 output power levels; a four bit packet type field indicates the symbol rate and the number of bits per symbol; a six bit Tx wait time field indicates the length of time the transmitter is to wait before transmitting the packet into the channel; a two bit preamble length field indicates the number of bytes in the preamble which can range from 0 (i.e., no preamble) to 3; the 0 to 3 byte optional preamble; one bit double rate (DR) field; three MSBs of the data length; a three bit network ID field; 8 LSBs of the data length and 3 to 2047 data bytes.

The 4 bit packet type, DR bit, 3 MSBs of the data length, 3 bit network ID field, status bit, 8 LSBs of the data length, 8 bit CRC check sum on the header; 3 to 2047 data bytes, 16 bit CRC value and any zero padding are placed onto the channel. For receiving, the data packet sent by the modem to the host comprises: a '1111' sequence appended to the 4 bit packet type, DR bit, 3 MSBs of the data length, 3 bit network ID field, status bit (i.e., ACK/NACK), 3 to 2047 data bytes and an 8 bit status field.

The configuration packet, generally referenced 146, conveys configuration and mode control data to the modem. The configuration packet is transmitted from the host to the modem via the SPI interface. The configuration packet can be adapted to configure and control a plurality of parameters and operations of the modem. The configuration parameters pertinent to the invention are described below. Examples of parameters that can be configured include, but are not limited to, SPI mode (normal or loopback), modem network ID, receiver acquisition threshold, channel separation, coefficients of the FIR filter in the transmitter, etc. With reference to FIGS. 6A and 6B, the contents of the configuration packet comprises: the byte value 0x0B to identify the packet as a configuration packet; length of the configuration packet; interrupt mask register ('0' indicating INT disabled and '1' indicating INT enabled); $INT_8$ location (value 0 indicating $INT_8$ to be issued before the $CRC_{16}$ value is transmitted, a value between 1 to 255 indicating $INT_8$ to be issued N bytes before the end of transmission); and $INT_3$ location (value 0 indicating $INT_3$ to be issued before the $CRC_{16}$ value is received, a value between 1 to 255 indicating $INT_3$ to be issued N bytes before the end of reception).

Figure 7:
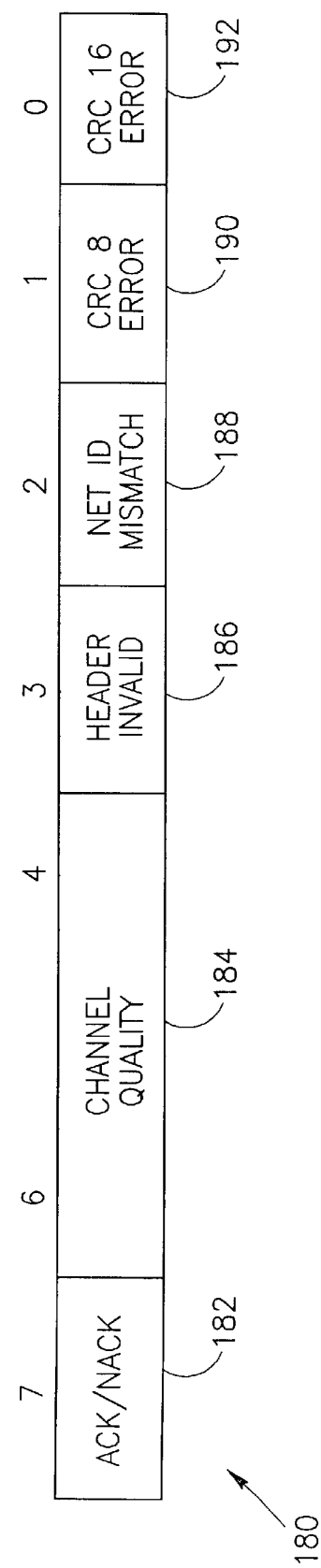
FIG. 7 is a diagram illustrating the structure of the status packet appended to every packet sent from the modem to the host.

A diagram illustrating the structure of the status byte appended to every packet sent from the modem to the host is shown in FIG. 7. A status byte is appended to the end of all received packets. After the status byte is sent, the CD* signal is negated. The status byte, generally referenced 180, comprises: an ACK/NACK bit to indicate the result of the CRC calculation of the last packet received whereby a '1' indicates that the last packet was received successfully by the originator of the current packet and a '0' indicates the last packet was not received successfully; 3 bit channel quality ranging from 0 to 7 whereby values 0 to 3 indicate errors were found in the data before FEC was applied and values 4 to 7 indicate no errors were found; a header error bit whereby a '1' indicates an invalid header was received; a network ID bit whereby a '1' indicates an incorrect network ID was received; a $CRC_8$ bit whereby a '1' indicates a $CRC_8$ error for the header; and a $CRC_{16}$ bit whereby a '1' indicates a $CRC_{16}$ error for the data.

Note that in general, one or more fields of the status byte are used to report information about the received packets received from the transmitter on the other end of the communication link. The information sent to the host may comprise an indication of the success or failure of the last packet received or may comprise an indication of the quality of transmission as measured by the receiver on the other end. The indication may comprise any suitable metric, for example, signal to noise ratio (SNR), bit error rate (BER), received bit rate, etc.

Packet Transmission and Reception

Figure 8:
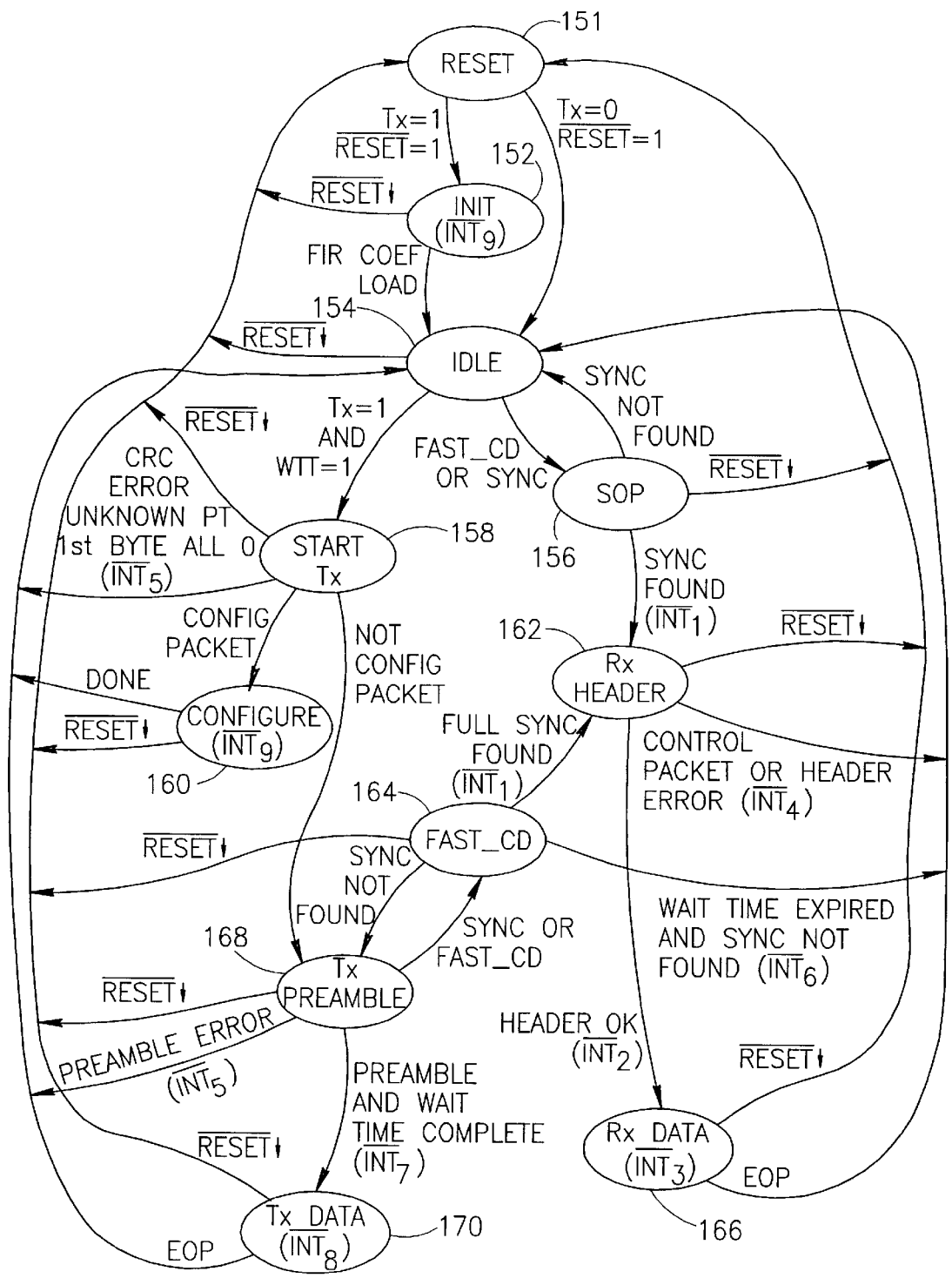
FIG. 8 is a state transition diagram illustrating the state machine for driving the interface between modem and host and for transmitting and receiving packets over the channel.

The mechanism of transmission and reception of packets will now be described in more detail. The modem of the present invention utilizes a state machine in the transmission and reception of data to and from the channel and to and from the host. A state transition diagram illustrating the state machine for driving the interface between modem and host and for transmitting and receiving packets over the channel is shown in FIG. 8. The state transition diagram, generally referenced 150, comprises a plurality of states and paths to enter and exit the states. Note that the modem also comprises interrupt means whereby an interrupt is generated at various stages of transmission and repetition. A host, in combination with its knowledge of the previous state of the modem, can use the interrupt signal as an indication of the current status and state of the modem. Note that although the example modem is shown with a single interrupt line, reference is made to a plurality of interrupt signals, e.g.. $INT_1$ to $INT_9$ wherein each interrupt denotes an interrupt at a particular point in the transmission or reception of a packet. The particular numbered interrupts are indicated in FIG. 8 within parenthesis. Note also that it is not intended that the present invention be limited to a modem having a single interrupt, as it is appreciated to one skilled in the art can appreciate that the modem can be constructed whereby a plurality of interrupts can be indicated, such as by use of a plurality interrupt lines and a single interrupt request line.

Upon RESET* assertion, the modem enters the RESET state 151 which is the global reset state wherein all variables, except configuration variables, are set to their default values, i.e., initial values. The configuration variables are set to their default values only if the Tx line is set during the RESET state. When the RESET* line is de-asserted, the modem checks the Tx line. If the Tx line is cleared, the modem enters IDLE state 154 which is the local reset state. If the Tx line is set, the modem enters INIT state 152.

In the INIT state the FIR coefficients used for transmission of symbols onto the line are initialized. In addition, during the INIT state the CD* output is set high, WTT is set to 'false' and $INT_9$ is issued. After initialization of FIR coefficients is complete, the modem de-asserts the INT* line and enters the IDLE state.

If the TX line is low, i.e., no transmit request pending from the host, the variable waiting time to transmit (WTT) is set to false and the CD* output is set high. The WTT variable is normally set high on the rising edge of the TX signal from the host. The modem remains in the IDLE state until the wait time to transmit (WTT) variable is true and the TX line is high (i.e., the request is still pending) at which point the modem enters the START TX state 158.

In the START TX state, the first two bytes of the packet are read from the host and the CD* output signal is set high. If while in the STAR TX state, (1) a CRC error occurs for the last received packet and the conditional transmission mode is selected or (2) an unknown packet type (PT is detected, than the current transmission is aborted and an $INT_5$ is issued.

If the packet transferred from the host is a configuration packet, identified by a first byte equal to 0x0B, the modem enters the CONFIGURE state 160 wherein $INT_9$ is issued. The modem processes the contents of the configuration packet and sets any internal registers accordingly. Once processing is complete, the modem returns to the IDLE state and de-asserts INT*.

If the packet transferred from the host is not a configuration packet, the modem enters the TX PREAMBLE state 168. Note that a configuration packet is identified by a 0x0B packet type with a power level of zero. Thus, if the power level bits are not all zero, the packet type is other than a configuration packet. If the power level bits are all zeros and the packet type (i.e., the first byte) is other than 0x0B, the modem returns to the IDLE state and an $INT_5$ is issued. In the TX PREAMBLE state the modem times the optional wait period, transmits the optional preamble and sets output CD* high. Note that if a non-legal preamble pattern is detected the modem returns to the IDLE state and an $INT_5$ is issued.

Once the wait time and preamble transmission are complete, an $INT_7$ is issued and the modem enters the TX DATA state 170. In this state, the CD* output is set high and the modem transmits the header and the payload of the data packet. An $INT_8$ is issued when there are N data bytes left to transmit until the end of packet (EOP) transmission, in order to give the host time to prepare for the next packet. If N is equal to or greater than the packet length, $INT_8$ will be issued after transmission of the last data byte. While in the IDLE state, if a fast carrier detect (fast_cd) or the start of a synchronization sequence (sync sequence) is detected, the modem enters the start of packet (SOP) state 156. A search for the sync sequence is performed in this state. If sync is not found, the modem returns to the IDLE state. If sync is found, $INT_1$ is issued and the RX HEADER state 162 is entered. Issuing $INT_1$ causes WTT to be set to false in order to permit the host to reconsider its transmission request.

Reception of the header portion of the packet is performed in the RX HEADER state. If the host requests a transmission during this state, the 'true' value of WTT will be preserved. If (1) there is an error in the received header, (2) data is received beyond a valid control packet, (3) a control packet is received with error(s) or (4) a control packet was received when the option was cancelled, an $INT_4$ is issued and the modem returns to the IDLE state.

If no errors in the header are found or a short packet is detected, the modem enters the RX DATA state 166 which is the data reception state, issues an $INT_2$ (for data packets only) and sets CD* low. During this state, the packet data is received in accordance with the packet length (3 bytes for a short packet type). In addition, the output signal CD* is set low. An $INT_3$ is issued when there are N bytes left to receive before the end of packet (EOP), i.e., end of reception, is reached. Note that there is no data to be received in the RX DATA state in the case of a control packet. In all cases, however, the status byte is appended to the received packet.

If while in the TX PREAMBLE state 168, a fast_cd or sync is detected, the modem enters the FAST_CD state 164. The CD* signal output from the modem controller to the host is set low and the receiver is operative to check for a false sync sequence. The fast carrier detect mechanism is adapted to provide an indication of the first 2 or 3 symbols of the sync sequence as opposed to detecting a complete sync sequence which takes considerably more time. Thus, the fast_cd signal does not provide a full indication that sync has been achieved. If a fast_cd is received, however, there is a high probability that a full sync will be detected. Issuing the fast_cd permits the modem to provide a faster response and better performance.

If ultimately a full sync is not detected and the wait time period has not yet expired, the modem returns to the TX PREAMBLE state 168. If full sync was achieved, an $INT_1$ is issued, transmission is aborted and the RX HEADER state 162 is entered. It while in the FAST CD state, the wait time expired and full sync has not yet been achieved, the packet receive being received is aborted, an $INT_6$ is issued and the modem returns to the IDLE state.

Note that in all states, a negative transition of the RESET signal causes the modem to enter the RESET state 151.

Figure 9:
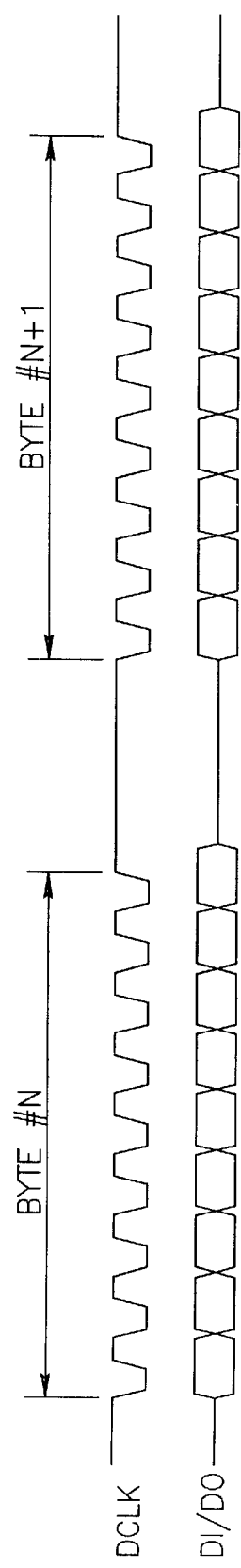
FIG. 9 is a timing diagram illustrating the general transfer of information between the host and the modem.

To aid in understanding the present invention a series of timing diagrams are presented illustrating the timing relationships between the various interface signals sent between the host and the modem. A timing diagram illustrating the general transfer of information between the host and the modem is shown in FIG. 9. As described previously, in this example embodiment, data is transferred between the host and the modem serially. The data is transferred synchronously via the data clock (DCLK), data in (DI) and data out (DO) signals lines. The data rate is dictated by the modem that provides the DCLK signal to the host while the host is instructed when to read or write data from or to the modem.

A timing diagram illustrating the general transmission of data from the host to the modem and onto the channel is shown in FIG. 10. The rate of the data clock is dependent on the maximal data rate the host can handle. Data is written on the falling edge and is stable on the rising edge. Input data is sampled on the rising edge of DCLK. The data is transferred synchronously byte by byte. Shown are two sample serial byte transfers labeled byte #N and byte #N+1. Note that the direction of data flow between the host and modem is indicated by the state of the CD* output signal. A low indicates data flows from modem to host and a high indicates data flows from the host to the modem.

Packet transmission is initiated by the host with the assertion of the TX signal. The modem issues the data clock DCLK and in response, the host begins to transfer the packet. The first information transferred is the 2 byte control field followed by an optional wait time of length $T_{WAIT}$ and then an optional preamble is transferred. While the modem is transmitting the preamble, the TS output signal reflects the preamble symbols. The preamble begins the packet transmission onto the channel and shown in the CHANNEL trace. If a collision is detected during the preamble or if a packet is received during the wait time, the modem asserts the CD* signal and clears the TX request (the WTT variable is set to false). In this case, the host is required to clear the TX signal and to retry transmission alter a back-off time period.

The sync sequence follows the preamble along with assertion of $INT_7$ to indicate the start of transmission (the transmission of the preamble is not recognized as the start of transmission). Sometime before the end of the sync sequence, the modem begins to transfer the packet header and payload from the host. After a short delay for processing in the modem, the packet contents are transmitted onto the channel. At a point in time $T_{TXPRE}$ corresponding to N bytes before the end of the transmission, an $INT_8$ is issued to the host.

If no wait time and no preamble are specified, transmission begins with the sync sequence a short time after the modem reads the first two control bytes of the packet. Note that the sync sequence is generated by the modem and is not provided by the host. In addition, during the optional wait time, no data is transferred from the host to the modem.

A timing diagram illustrating the hold requirement for the TX signal is shown in FIG. 11. The host raises the transmit request TX before the previous packet #N is completed. The host must hold TX high for the hold time $T_{HOLD}$ before it is permitted to lower it. Immediately after the previous packet is completed, the 2 byte control portion of the next packet #N+1 is read from the host by the modem. After the optional wait time and preamble, $INT_7$ is issued and the contents of the packet are transferred from the host and transmitted onto the channel. The output signal TS is adapted to indicate when the modem is transmitting on the channel.

Figure 12:
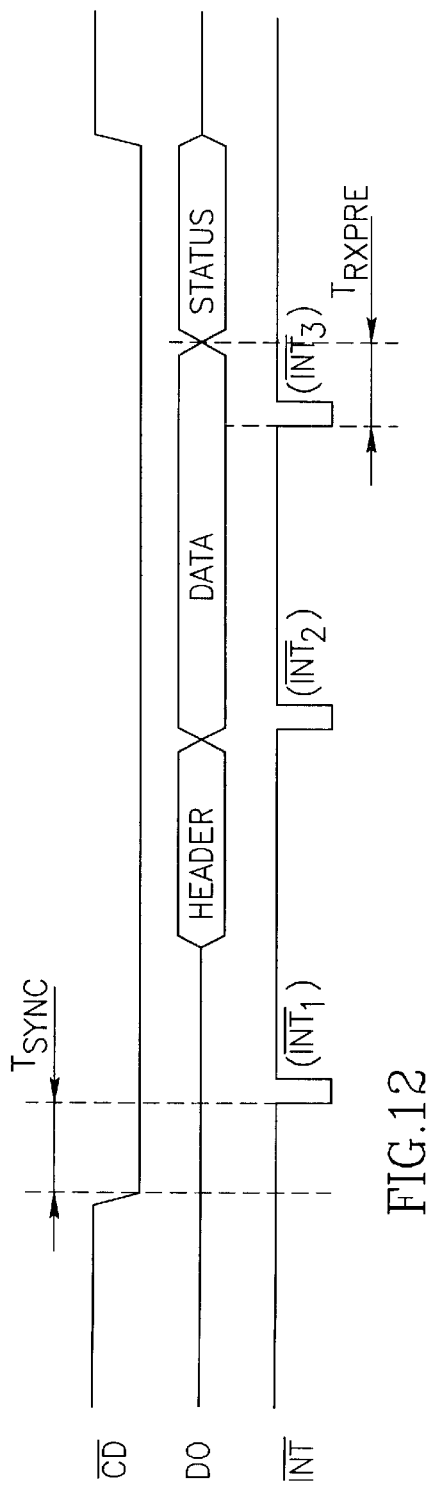
FIG. 12 is a timing diagram illustrating the general reception of data from the channel and to the host.

A timing diagram illustrating the general reception of data from the channel to the host is shown in FIG. 12. When the modem is to receive data it asserts the CD* signal. The CD* signal is asserted upon the modem detecting the presence of a signal, which normally occurs during reception of the sync sequence. Many factors influence the ability of the modem to detect the presence of a signal e.g., a signal to noise ratio (SNR), channel conditions, operating rate of the modem, etc. The fast carrier detect (fast_ed) mechanism in the modem permits early detection of the beginning or the synchronization sequence. If CD* goes high (i.e., de-asserted) before full synchronization is achieved, no interrupt is issued, no status byte generated and if the transmitter was in the midst of a wait time and the time has not elapsed, the modem returns to wait the remaining time and resumes transmission.

Once full synchronization is achieved and at a time $T_{SYNC}$ after CD* is brought low, an $INT_1$ is issued and header reception begins. Note that the time $T_{SYNC}$ may be zero if the fast_cd mechanism is disabled. Once the header is received, the modem knows the length of the packet it is expecting. An $INT_2$ is issued and packet data begins to be received. Note that an $INT_2$ is not issued for short and control type packets. At a time $T_{RXPRE}$ (corresponding to N bytes) before the end of the packet, an $INT_3$ is issued to the host. Once the packet reception is complete, the modem generates the status byte and appends it to the packets packet being forwarded to the host. After the packet reception is complete, the CD* signal is de-asserted (i.e., set high) indicating the end of packet (EOP). Note that assertion of RESET during packet reception causes the reception to be aborted.

Figure 13:
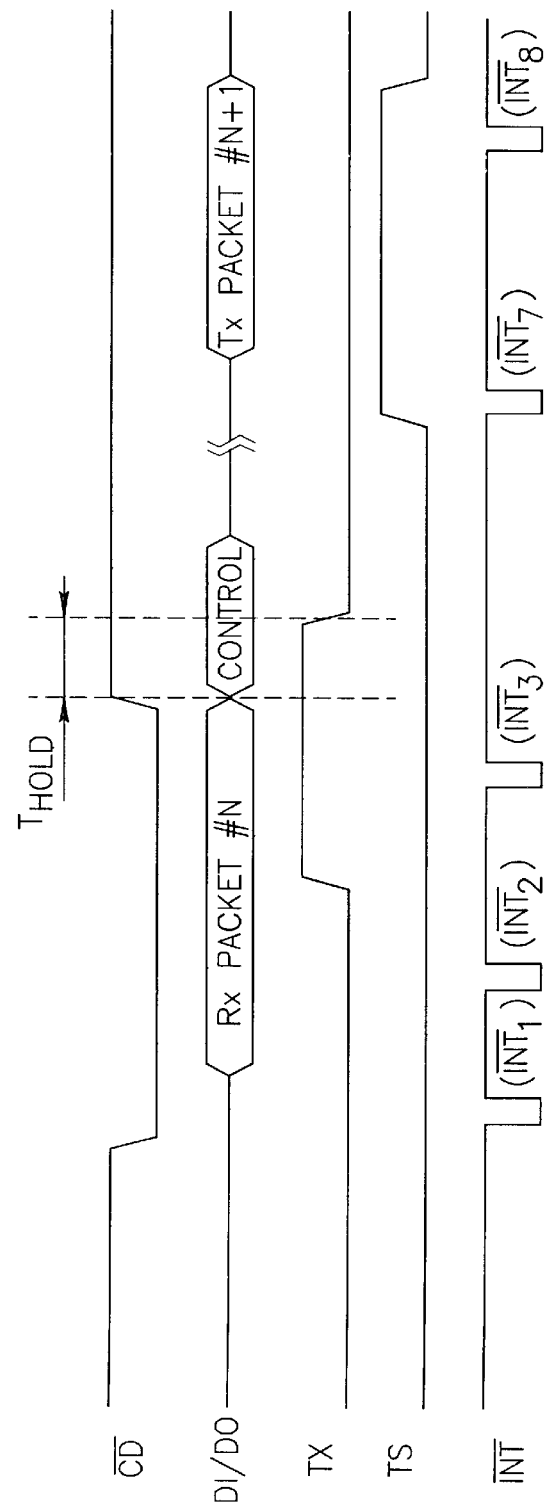
FIG. 13 is a timing diagram illustrating a TX request during reception of a packet.

A timing diagram illustrating a TX request during reception of a packet is shown in FIG. 13. During the reception of packet #N, CD)* is low. At a point during the reception of packet #N after $INT_1$, the host raises the transmit request TX. The host is required to hold TX high for a time $T_{HOLD}$ after CD* is brought high. After the reception of packet #N is completed, the 2 byte control field of the next packet #N+1 is read in by the modem. The transmission continues with the optional wait time and optional preamble. The output TS is brought high, $INT_7$ is issued, the packet is transmitted and $INT_8$ is issued indicating the end of transmission.

Figure 14:
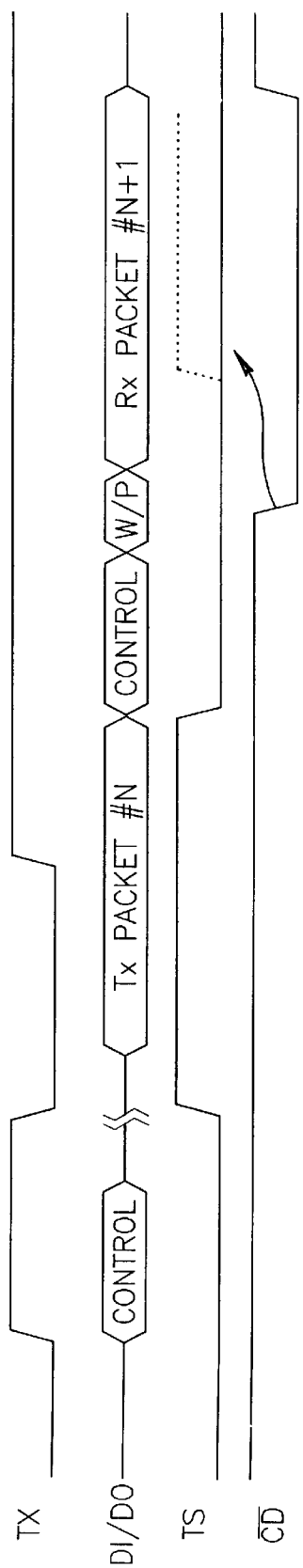
FIG. 14 is a timing diagram illustrating the cancellation of a TX request on the arrival of a packet over the channel.

A timing diagram illustrating the cancellation of a TX request on the arrival of a packet over the channel is shown in FIG. 14. The host raises the transmit request TX and in response, the modem reads in packet #N and immediately begins transmission onto the channel as indicated by TS. The host lowers TX and sometime thereafter asserts TX again to indicate that the next packet is ready for transmission. The second packet begins transmission immediately following the completion of the packet #N transmission.

During the transmission of packet #N+1, after the control bytes are read from the host but before the packets contents are placed onto the channel (i.e., during wait time or preamble as indicated by W/P), the modem detects a packet being received. The CD* output signal is brought active, i.e., low, indicating a collision detection, the transmission is cancelled and the modem enters the packet reception mode. The dotted lines indicate that transmission is cancelled and the modem is placed in reception mode, i.e., TS remains low and CD* is brought low.

Figure 15:
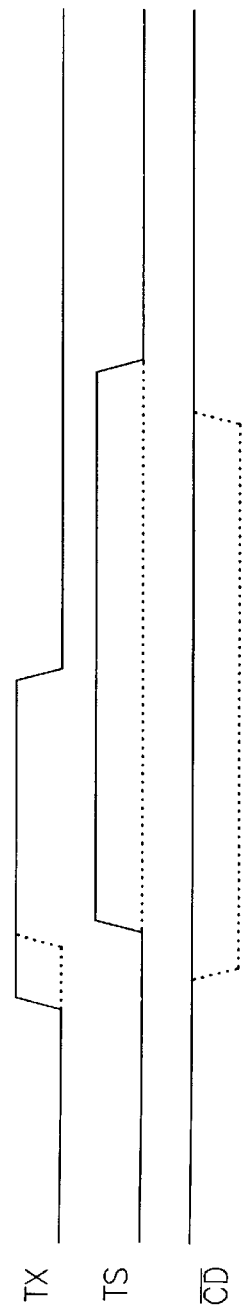
FIG. 15 is a timing diagram illustrating the simultaneous occurrence of a request to transmit and the arrival of a packet from the channel.

A timing diagram illustrating the simultaneous occurrence of a request to transmit and the arrival of a packet from the channel is shown in FIG. 15. With reference to the solid TX, TS and CD* signal traces, if the transmit request TX from the host arrives before a receive signal is detected (i.e., before CD* is asserted), than the TX request is serviced and the incoming packet may be lost unless it is detected during the TX_PREAMBLE state of the packet currently being transmitted (as described above in connection with FIG. 14). If TX is asserted sufficiently before the receipt of a packet, the assertion of CD* will be prevented. This will likely occur when the transmitter is not configured to send a preamble and the far side transmitter is configured to send a preamble and thus have quiet periods where it is listening to the channel.

With reference to the dotted TX, TS and CD* signal traces, if the receive packet is detected before the host asserts the transmit request TX, as indicated by the dotted portion of the TX trace, then the TX request is cancelled, transmission is aborted, CD* is brought low and packet reception begins.

Regardless of when TX arrives in relation to CD*, the host should lower TX when it detects that CD* is low indicating reception of a packet. Typically, the host may not know if CD* was brought low before or after TX is asserted. If CD* is brought low after TX is asserted, the host can maintain TX high until packet reception is complete, i.e., CD* is brought high. Since, however, the host in most cases cannot tell with precision which came first, it is preferable for the host upon detecting CD* low to lower TX and re-assert it at a later time.

To aid in understanding the principles of operation of the state machine used to implement the serial interface, transmit and receive functions in the modem, the state transition is presented in Listing 1 below.

Listing 1: State Machine Operation

```
case state is
when RESET
    if reset = 1 then
        if TX = 0 then
            state = IDLE;
        else
            state = INIT;
        end if
    end if
end when
when INIT
    CD to host = 1;
    if initialization complete then
        state = IDLE;
    end if
end when
when IDLE
    CD to host = 1;
    waiting_to_transmit (WTT) = FALSE;
    if reset = 1 then
        if TX = 1 and WTT= TRUE then
            state = START_TX;
        else if fast_cd or sync detected then
            state = SOP;
        end if
    end if
end when
when SOP
    CD to host = 0;
    if reset = 1 then
        if no fast_cd or no sync detected then
            state = IDLE;
        else if sync found then
            state = RX_HEADER;
            WTT = FALSE;
        end if
    end if
end when
when START_TX
    CD to host = 1;
    if reset = 1 then
        if CRC error on last received packet and CT selected then
            state = IDLE;
        else if packet is a configuration packet then
            state = CONFIGURE;
        else if packet is of short, control or data type then
            state = TX_PREAMBLE;
        else if unknown packet type then
            state = IDLE;
        end if
    end if
```

-continued

Listing 1: State Machine Operation

```
end when
when CONFIGURE
    CD to host = 1;
    if reset = 1 then
        if configuration packet processing complete then
            state = IDLE;
        end if
    end if
end when
when TX_PREAMBLE
    CD to host = 1;
    if reset = 1 then
        if fast_cd or sync detected then
            state = FAST_CD;
        else if wait time and preamble transmission complete then
            state = TX_DATA;
        else if non-legal preamble pattern is in use then
            state = IDLE;
        end if
    end if
end when
when FAST_CD
    CD to host = 0;
    if reset = 1 then
        if full sync not found then
            if sync not found after expiration of wait time then
                state = IDLE;
                WTT = FALSE;
            else if sync not found before expiration of wait time then
                state = TX_PREAMBLE;
            end if
        else if full sync found then
            state = RX_DATA;
            WTT = FALSE; *cancels the last TX request
        end if
    end if
end when
when TX_DATA
    CD to host = 1;
    if reset = 1 then
        if end of packet (EOP) reached then
            state = IDLE;
        end if
    end if
end when
when RX_HEADER
    CD to host = 0;
    if reset = 1 then
        if header received correctly then
            state = RX_DATA;
        else if header error or data received after control packet then
            state = IDLE;
        end if
    end if
end when
when RX_DATA
    CD to host = 0;
    if reset = 1 then
        if EOP reached then
            state = IDLE;
        end if
    end if
end when
end case
```

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A modem controller apparatus for use in a modem having a transmitter and a receiver, said modem coupled between a communications channel and a host, comprising:
    means for receiving transmit data and control data from said host wherein said transmit data is transmitted over said communications channel by said transmitter and said control data is used to configure and control the operation of said modem;
    means for receiving data transmitted over said communications channel from said receiver and for forwarding said receive data to said host;
    means for waiting an optional wait period before attempting transmission of a packet onto said channel;
    means for transmitting an optional preamble comprising at least one quiet period and the transmission of at least one predetermined symbol:
    back-off means for detecting the reception of a packet during one or more quiet periods of said preamble and aborting transmission if reception of a packet is detected;
    means for conveying first information comprising an indication of reception success or failure of the last packet received by said modem in a packet being transmitted; and
    means for declaring partial synchronization, including notification of said host that a synchronization event has occurred, upon detection of a fewer number of valid symbols than that required to achieve full synchronization, and wherein full synchronization is either reaffirmed or de-affirmed one or more additional symbol times in the future.

2. The apparatus according to claim 1, wherein said modem controller comprises a serial interface wherein said transmit data, said control data and said received data are communicated between said host and said modem serially and wherein said host transfers both transmit data and control data to said modem within the same serial bit stream.

3. The apparatus according to claim 1, wherein said modem controller comprises a parallel interface wherein said transmit data, said control data and said received data are communicated between said host and said modem in parallel and wherein said host transfers both transmit data and control data to said modem within the same bit stream.

4. The apparatus according to claim 1, wherein communication between said host and said modem occurs over a plurality of signals comprising a data clock, serial input data and serial output data.

5. The apparatus according to claim 1, wherein said back-off means is adapted to wait a random time interval before attempting retransmission.

6. The apparatus according to claim 1, wherein said back-off means is adapted to wait a predetermined time interval set by a user before attempting retransmission.

7. The apparatus according to claim 1, wherein said first information comprises an indication of the reception success or failure of the last packet received by a said modem as determined by comparing a Cyclic Redundancy Check (CRC) sum calculated to a Cyclic Redundancy Check Sum.

8. The apparatus according to claim 1, wherein said first information comprises an indication of the reception success or failure of the last packet received by said modem as conveyed via a status bit in said packet to be transmitted.

9. The apparatus according to claim 1, wherein said first information comprises an indication of the reception success or failure of the last packet received by said modem as conveyed via an ACK/NACK bit in said packet to be transmitted.

10. The apparatus according to claim 1, further comprising second information comprising an indication of the quality or transmission as measured by a far end.

11. The apparatus according to claim 1, further comprising second information comprising an indication of the Signal to Noise Ratio (SNR) as measured by a far end.

12. The apparatus according to claim 1, further comprising second information comprising an indication of the Bit Error Rate (BER) as measured by a far end.

13. The apparatus according to claim 1, further comprising conditional transmission means for enabling the transmission of a packet if and only if the transmission of the previous packet was successful.

14. The apparatus according to claim 1, further comprising means for maintaining synchronization between said host and said modem whereby said host is continually informed as to the current activity of said modem.

15. The apparatus according to claim 1, further comprising means for said host to select the timing of the transmission of the next packet wherein said host prepares data to be sent to said modem and issues a transmit request signal subsequent thereto.

16. The apparatus according to claim 1, further comprising means for said host to select the timing of the transmission of the next packet during the reception of a packet by said modem wherein said host prepares data to be sent to said modem and issues a transmit request signal subsequent thereto.

17. A modem apparatus coupled between a communications channel and a host, said host providing data and control packets to said modem, comprising:
- a transmitter for transmitting transmit data over said communications channel;
- a receiver for receiving data transmitted over said communications channel;
- detection means for detecting the reception of a packet after said host sends transmit data to said modem but before the actual transmission of data over said communications channel; and
- a modem controller operative to:
  - receive transmit data and control data from said host;
  - forward said transmit data to said transmitter for transmission over said communications channel;
  - configure and control the operation of said modem in accordance with said control data;
  - receive data transmitted over said communications channel from said receiver;
  - forward said received data to said host;
  - in response to receipt of a packet by said detection means, cause said modem to switch from a transmit mode to a receive mode without any intervention of said host and for notifying said host that the current transmission attempt is to be aborted; and
  - declare partial synchronization, including notifying said host that a synchronization event has occurred, upon detection of a fewer number of valid symbols than that required to achieve full synchronization, and wherein full synchronization is either reaffirmed or de-affirmed one or more additional symbol times in the future.

18. The apparatus according to claim 17, further comprising means for waiting an optional wait period before attempting transmission of a packet onto said communications channel.

19. The apparatus according to claim 17, further comprising means for transmitting an optional preamble comprising at least one quiet period and the transmission of at least one predetermined symbol.

20. The apparatus according to claim 17, further comprising means for maintaining synchronization between said host and said modem whereby said host is continually informed as to the current activity of said modem.

21. The apparatus according to claim 17, further comprising means for controlling the transmission of data over said communications channel wherein the operation of said modem apparatus is directed according to the contents of said control data received from said host.

22. The apparatus according to claim 17, further comprising means for said host to select the timing of the transmission of the next packet wherein said host prepares data to be sent to said modem and issues a transmit request signal subsequent thereto.

23. The apparatus according to claim 17, further comprising means for said host to select the timing of the transmission of the next packet during the reception of a packet by said modem wherein said host prepares data to be sent to said modem and issues a transmit request signal subsequent thereto.

24. A method for controlling low level access in a modem apparatus having a transmitter and a receiver, said modem coupled between a communications channel and a host, said method comprising:
- receiving transmit data and control data from said host wherein said transmit data is transmitted over said communications channel by said transmitter and said control data is used to configure and control the operation of said modem;
- receiving data transmitted over said communications channel from said receiver and forwarding said receive data to said host;
- waiting an optional wait period before attempting transmission of a packet onto said communications channel;
- transmitting an optional preamble comprising at least one quiet period and the transmission of at least one predetermined symbol;
- detecting the reception of a packet during one or more quiet periods of said preamble;
- aborting transmission of the current packet if reception of a packet is detected;
- conveying information about the last packet received by said modem in a packet being transmitted; and
- declaring partial synchronization, including notification of said host that a synchronization event has occurred, upon detection of a fewer number of valid symbols than that required to achieve full synchronization, and wherein full synchronization is either reaffirmed or de-affirmed one or more additional symbol times in the future.

* * * * *